Patented Apr. 13, 1943

2,316,323

UNITED STATES PATENT OFFICE 2,316,323

VINYL RESIN COATING COMPOSITION

Arthur K. Doolittle, South Charleston, W. Va., assignor to Carbide and Carbon Chemicals Corporation, a corporation of New York No Drawing. Application November 17, 1939, Serial No. 304,941

5 Claims. (Cl. 260—32)

The invention relates to vinyl resin compositions of the type suitable for use in the preparation of lacquers, varnishes, dopes and other coating and finishing materials. It is particularly concerned with novel and improved solvents for use in such vinyl resin compositions.

While vinyl resins of various kinds have been proposed for, and used in, surface coating compositions, the inherent physical and chemical characteristics of these resins have presented many problems arising from the formulation of them into satisfactory lacquers and the like. Prominent among these problems is a recurring difficulty in finding suitable and satisfactory solvents for these resins. Many compounds having a solvent action on other kinds of lacquer gums and resins will not dissolve the vinyl resins, and those which may exhibit a solvent power are often deficient in other characteristics. Numerous factors, other than actual solvent ability, contribute to the value of a lacquer solvent, and other properties of importance include such as a suitable evaporation rate, chemical stability, compatibility with other resins, gums, and diluents, an ability to resist blush or other defects in a drying lacquer film, and a satisfactory color and odor.

It is an object of this invention to provide new solvent compounds for vinyl resins having the above-mentioned desirable properties, and other characteristics which adapt them to the production of improved vinyl resin lacquers, varnishes, and other coating compositions.

I have found that compounds having a molecular structure composed of both a carbonyl and ether grouping have exceptional solvent ability for vinyl resins, and, in addition, exhibit the other requisite properties of a lacquer solvent. Particularly representative of these compounds are acyclic keto-ether compounds, such as alkyl ether derivatives of an acetone which include alkoxy acetones, such as methoxy acetone, ethoxy acetone, butoxy acetone, n-hexoxy acetone, and 2-ethyl butoxy acetone These compounds are liquids substantially water-white, or a pale yellow, in color, and their odor is unobjectionable They have marked compatibility, or tolerance for, coal tar hydrocarbons or other common lacquer diluents, and they retain their solvent action in very high dilutions with such diluents as toluene Being relatively stable compounds, with comparatively high boiling points and low evaporation rates, they are satisfactory as to these characteristics. Ethoxy acetone, for example, has a boiling point of about 126° C., and an evaporation rate a little slower than normal butyl acetate. Other solvents of the group specified will vary in the latter properties in accordance with the complexity of the alkoxy radical.

The vinyl resins with which the invention is directly concerned are those which may be prepared by the conjoint polymerization of vinyl halides, such as vinyl chloride, with vinyl esters of the lower aliphatic acids, such as vinyl acetate, propionate, butyrate, and formate. Preferred resins of this type may be prepared from vinyl chloride and vinyl acetate, in the proportions of about 60 to 95 parts of vinyl chloride to from 40 to 5 parts of the acetate, and those resins are particularly desirable which contain in the polymer from about 80 to 90 parts of the chloride, and have an average molecular weight of from about 8,000 to 12,000, as estimated from the specific viscosity of dilute solutions according to Staudinger's method. The particular method of forming the vinyl resins forms no part of the present invention, and they may be prepared in any manner known to the art.

In a complete thinner formula the most desirable proportions or concentration of the solvent may be varied over a wide range, and will be dependent upon a number of factors, such as the particular vinyl resin base employed, the nature of the other solid ingredients in the lacquer, and the method of application or required use of the coating composition. A representative complete lacquer formula employing ethoxy acetone is as follows, in which the vinyl resin specified is the conjointly polymerized product of vinyl chloride and vinyl acetate containing about 80% to 90% of vinyl chloride, and having an average molecular weight of from about 8,000 to 10,000.

|  | Per cent |
|---|---|
| Titanium dioxide/antimony oxide (9:1) | 4.46 |
| Lamp black | .48 |
| Vinyl resin | 9.34 |
| Dibutyl ether of ethylene glycol phthalate | .77 |
| Tricresyl phosphate | 1.24 |
| Ethoxy acetone | 8.37 |
| Toluene | 75.34 |

An important attribute of these new solvents is their high dilution tolerance for the usual hydrocarbon diluents. For example, a stable fluid solution containing about 7% of vinyl resin has been prepared in which the liquid portion consists of only 10 parts of ethoxy acetone diluted with 90 parts of toluene (all proportions by weight), and this could be even further diluted to an ethoxy acetone proportion of only 7 parts before a resin precipitation occurred. The formula of the above example, further illustrating a high toluene dilution, was unchanged in properties after aging in a container for a week, whereas with prior known vinyl resin solvents of corresponding evaporation rate, in similar lean thinner mixtures, resin precipitation or "seeding" has always taken place on aging.

Other materials of solvent action on the resin may be used in conjunction with those here disclosed without departing from the spirit of this invention, and as the example shows, the usual lacquer modifying agents, such as stabilizers, plasticizers, dyes, pigments, and the like, can be included without effect upon the essential advantages afforded by these new solvent compounds. Numerous modifications in specific lacquer formulae are contemplated within the scope of the invention, which should not be limited other than as indicated by the appended claims.

I claim:
1. A vinyl resin composition essentially comprising a vinyl resin resulting from the conjoint polymerization of a vinyl halide with a vinyl ester of an aliphatic acid, and a solvent having marked compatibility for coal tar hydrocarbons and being adapted to retain its solvent action for the resin in high dilutions with toluene, said solvent comprising an alkoxy acetone.

2. A vinyl resin coating composition essentially comprising a vinyl resin resulting from the conjoint polymerization of vinyl chloride with vinyl acetate and containing from 80% to 90% by weight of vinyl chloride, dissolved in a thinner containing as the essential solvent material methoxy acetone.

3. A vinyl resin coating composition essentially comprising a vinyl resin resulting from the conjoint polymerization of vinyl chloride with vinyl acetate and containing from 80% to 90% by weight of vinyl chloride, dissolved in a thinner containing as the essential solvent material ethoxy acetone.

4. A vinyl resin coating composition essentially comprising a vinyl resin resulting from the conjoint polymerization of vinyl chloride with vinyl acetate and containing from 80% to 90% by weight of vinyl chloride, dissolved in a thinner containing as the essential solvent material butoxy acetone.

5. A vinyl resin composition essentially comprising a vinyl resin resulting from the conjoint polymerization of vinyl chloride with vinyl acetate and containing from 80% to 90% by weight of vinyl chloride, dissolved in a thinner containing as the essential solvent material an alkoxy acetone, said alkoxy acetone having marked compatibility for coal tar hydrocarbons and being adapted to retain its solvent action for the resin in high dilutions with toluene.

ARTHUR K. DOOLITTLE.